United States Patent [19]

Stewart

[11] 3,973,639
[45] Aug. 10, 1976

[54] COUPLER FOR DETACHABLE CONNECTING TWO SINGLE AXLE DRIVEN TRACTORS AS A SINGLE FOUR WHEEL DRIVE VEHICLE

[75] Inventor: Solomon Lan Stewart, Elfrida, Ariz.

[73] Assignees: John W. Mangum, Elfrida; George D. Stephens, IV, Douglas, both of Ariz. ; part interest to each

[22] Filed: Jan. 13, 1975

[21] Appl. No.: 540,649

[52] U.S. Cl. .............................. 180/14 R; 180/139
[51] Int. Cl.² ........................................... B60D 1/00
[58] Field of Search ............. 180/14 R, 14 A, 14 B, 180/14 C, 14 D, 14 E, 11, 12, 79.2 B; 280/400, 402, 456 A, 461 A

[56] References Cited
UNITED STATES PATENTS

| | | | |
|---|---|---|---|
| 2,727,581 | 12/1955 | Wright | 180/12 |
| 2,922,237 | 1/1960 | Harrison et al. | 180/79.2 B X |
| 3,061,029 | 10/1962 | Pryor | 180/12 |
| 3,119,630 | 1/1964 | Oliver | 180/14 R X |

FOREIGN PATENTS OR APPLICATIONS

| | | | |
|---|---|---|---|
| 48,605 | 12/1964 | Poland | 180/14 R |
| 49,290 | 4/1965 | Poland | 180/14 R |

*Primary Examiner*—M. H. Wood, Jr.
*Assistant Examiner*—R. Schrecengost
*Attorney, Agent, or Firm*—Warren F. B. Lindsley

[57] ABSTRACT

A coupler for detachably connecting two back axle power driven front wheelless tractors together in series to form a single four wheel drive vehicle.

12 Claims, 4 Drawing Figures

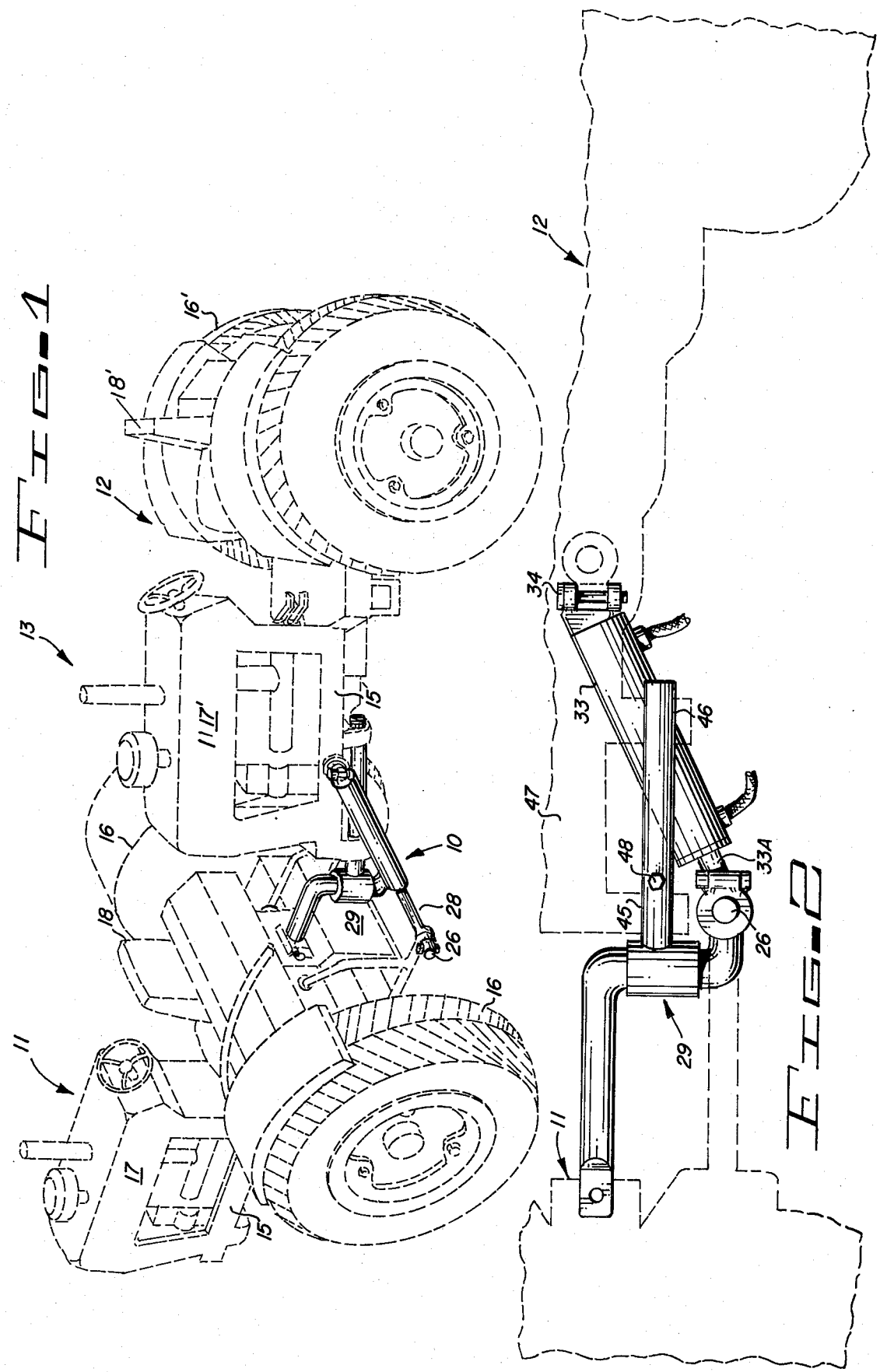

COUPLER FOR DETACHABLE CONNECTING TWO SINGLE AXLE DRIVEN TRACTORS AS A SINGLE FOUR WHEEL DRIVE VEHICLE

BACKGROUND OF THE INVENTION

In the past when the need existed for a four wheel drive vehicle such as a tractor one had to be purchased or rented to serve the needs of the user. In the case of small farmers, ranchers, contractors and the like purchase of such a vehicle was prohibitive and most of the time not available for rent.

Further, on small ranches and farms the need for a single drive tractor is common and most users have one available and can readily obtain another like vehicle if needed. Thus, if there was some way to connect two single drive tractors in series to form a single four wheel drive vehicle, a user could have available a four wheel drive vehicle when needed by merely having access to two single axle driven tractors.

1. Field of the Invention

This invention is directed to a novel coupler for connecting in a series arrangement the back of one single axle driven tractor with the front of another single axle tractor with both tractors having their front wheels and axle assemblies removed. This novel coupling arrangement employs means for interconnecting and utilizing the leading tractor for controlling the steering mechanism of the following tractor so that the two interconnected single axle driven tractors operate in unison as a four wheel drive vehicle.

2. Description of the Prior Art

Heretofore, attempts have been made to use one or more single axle driven tractors to do a four wheel tractor job but individually and in combination these single axle driven tractors lacked the versatility of a four wheel drive vehicle. Accordingly, the need exists in industry, on the farm and ranch for a four wheel drive vehicle especially if it can be assembled from a pair of two wheel drive readily available tractors with little difficulty in combining them into a single vehicle and then reconverting them back to their individual tractor status.

SUMMARY OF THE INVENTION

In accordance with the invention claimed, a new and novel coupler is provided which makes it possible to ready connect and disconnect a pair of tractors by removing the front wheel and axle assemblies of two single wheel drive tractors and then interconnecting the rear frame of one tractor with the front frame and steering mechanism of a following tractor to provide a four wheel drive vehicle.

It is, therefore, an object of this invention to provide a novel coupler for interconnecting two single axle driven tractors into a novel four wheel vehicle.

Another object of this invention is to provide a novel coupler employing means utilizing a control mechanism of one of the tractors for controlling the steering movements of the other tractor.

A further object of this invention is to provide a novel three point hitch coupler for interconnecting a leading single axle driven tractor with a following single axle driven tractor.

A still further object of this invention is to provide a coupler which provides a three point hitch connection between the leading and following tractors utilizing the front axle housing of the following tractor.

Further objects and advantages of the invention will be apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing in which:

FIG. 1 is a perspective view of the novel coupler of this invention interconnecting two single axle driven tractors together to form a four wheel drive vehicle.

FIG. 2 is a side view of the coupler shown in FIG. 1 with parts removed for the sake of clarity.

DESCRIPTION OF THE PREFERRED EMBODIMENT

Figure 3:
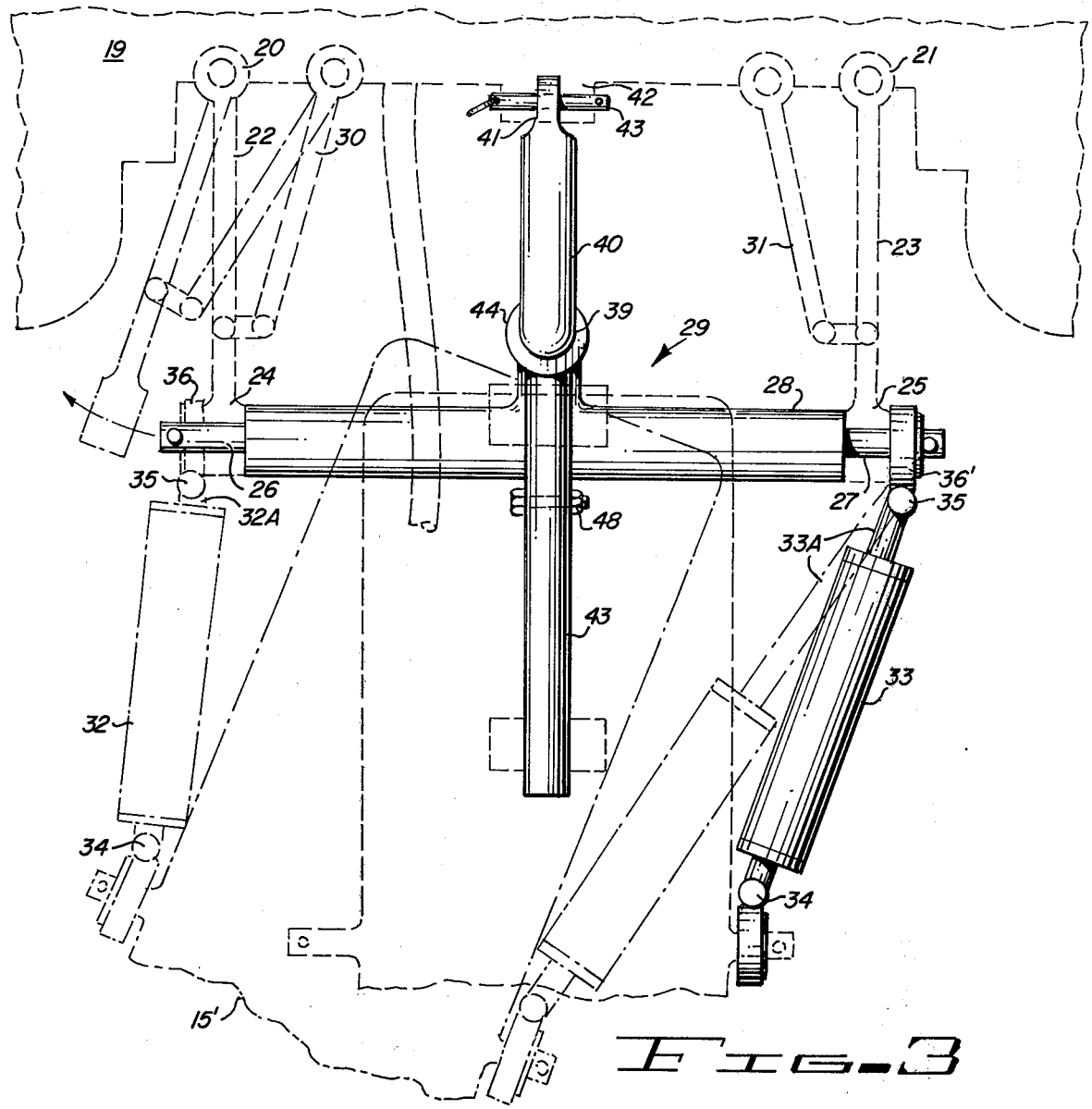
FIG. 3 is a top plan view of the coupler shown in FIGS. 1 and 2 with parts of each tractor and the coupler shown in dash lines illustrating their positions when the hydraulic pistons are actuated for a left turn of the vehicle.
Figure 4:
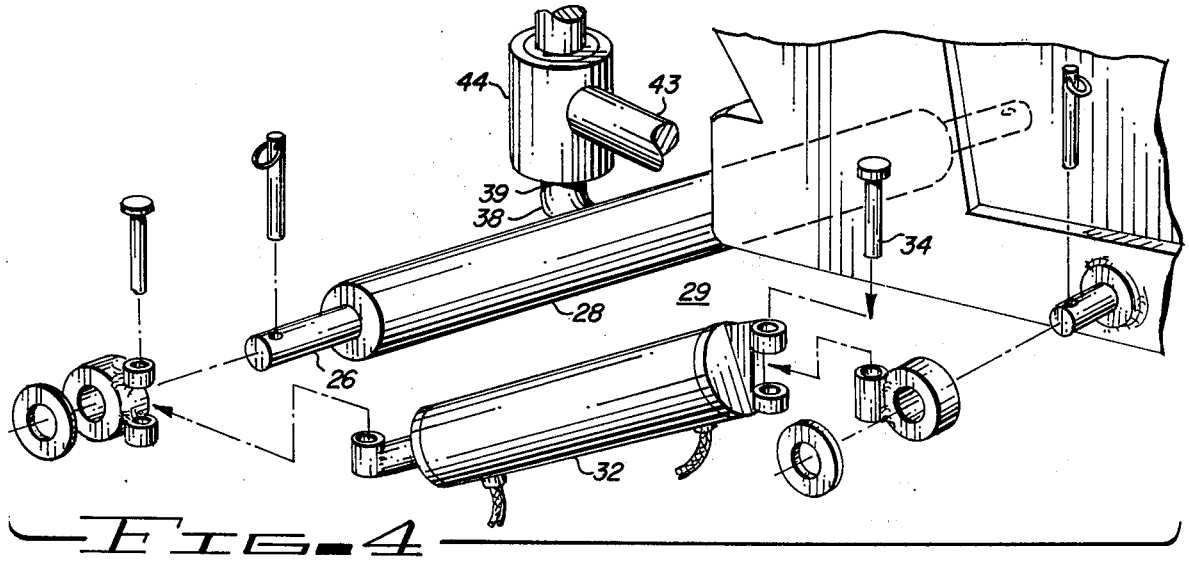
FIG. 4 is an exploded perspective view showing the various parts of the coupler.

Referring more particularly to the drawing by characters of reference, FIGS. 1–4 disclose a novel coupler 10 for interconnecting two rear axle driven tractors 11 and 12 into a novel four wheel drive vehicle 13. Tractors 11 and 12 are illustrated as being of the wheeled type consisting of frame 15, 15', ground contacting two rear drive wheels 16, 16', drive engines 17, 17', and driver's seats 18, 18', respectively. On the rear axle housing 19 of frame 15 of tractor 11 located inwardly of each side of the ground engaging rear wheels 16, 16 thereof, as shown in FIG. 3 is arranged a three point hitch connection forming a part of most tractors built today. This hitch is utilized as mounting points for the novel coupler disclosed for interconnecting the lead tractor 11 with the following tractor 12. The three point hitch connection on present day tractors is used for mounting most farm implements pulled or used with the tractors and is utilized herein to quickly and simply convert two, two wheel drive tractors into a four wheel drive vehicle.

The three point hitch connection comprises a pair of tie bars or side arms 22, 23 pivotally connected at one of their ends 20, 21 to tractor 11. These arms on the known tractors can be pneumatically or hydraulically lifted, lowered, or maintained at a given level by the operator of the tractor while remaining on an even level plane. When using the disclosed coupler, the arms 22, 23 are left in a position that would allow the top point of the disclosed coupler to be attached to the center hitch flange 42 of tractor 11, hereinafter described. The arms then would remain stationary while tractor 11 was used as a part of the four wheel drive vehicle created by tractors 11 and 12. The same type of three point hitch on tractor 12 will be used as the working hitch for the implements used on the newly created four wheel drive vehicle.

As noted from FIG. 3, the outer ends of the side arms 22, 23 are provided with bearing surfaces 24, 25 within which are pivotally mounted on the turned down ends 26, 27 of a shaft 28 forming part of a coupler 29. A pair of braces 30, 31 are pivotally mounted on the frame or back axle housing of tractor 11 one adjacent each pivotal point 20, 21 and fixedly connected to side arms 22, 23 to give added rigidity and to prevent side sway motion of the coupler, thereby firmly latching the two ends of shaft 28 of coupler 29 when coupler 29 interconnects the two tractors into a single vehicle.

A pair of actuating cylinders 32, 33 are pivotally connected by pins 34 at intermediate points along the sides of frame 15' of tractor 12 and have their piston rods 32A and 33A connected pivotally through pins 35 mounted in collars 36, 36' each of which are supported in bearing relationship one on each of the opposite ends of shaft 28 of coupler 29, as shown in FIG. 3.

The interconnecting means between frame 15 of tractor 11 and frame 15' of tractor 12 is coupler 29 which coupler comprises a first portion 38 arranged to extend substantially perpendicularly of shaft 28 toward frame 15 of tractor 11 when mounted thereon by side arms 22, 23, a second portion 39 extending substantially vertically upwardly a short distance from portion 39, and a third portion 40 extending laterally thereof terminating in an apertured flange 41 for insertion in an apertured cooperating U-shaped flange 42 on the rear portion of frame 15 of tractor 11 to form a pin connection when pin 43 is inserted through flanges 41 and 42, as shown.

Coupler 29 further comprises a connecting arm 43 one end of which is provided with a cylindrically shaped collar 44 extending laterally thereof for pivotally mounting around arm portion 39 of coupler 29. The other end of connecting arm 43 is arranged to extend through bearing surfaces 45 and 46 of the front wheel mounting 47 of tractor 12. Connecting arm 43 is held in the front wheel mounting of tractor 12 by any suitable means but is shown herein as a nut and bolt arrangement 48.

Thus, coupler 29 forms a three point connection for the interconnection of tractors 11 and 12, namely, the end connections of shaft 28 with arms 22 and 23 and the connection of portion 41 with flange 42 of tractor 11. The connections of hydraulic cylinders 32 and 33 with the ends of shaft 28 and the connection of arm 43 with the wheel mounting of tractor 12 form the balance of the coupler connection.

It should be noted that by manipulation of the controls for the actuating cylinders 31 and 32, the front end of tractor 12 may be turned to the right or left by extending or retracting their piston rods 32A and 33A in a manner well known in the art. It is to be kept in mind also that the actuating cylinders may be either hydraulic or pneumatically controlled and that the invention is merely directed to the coupler and not the means for controlling the actuating cylinders.

By way of example, the actuating cylinders 32 and 33 may be interconnected with a hydraulic system of tractor 11 and thus the operator of tractor 11 may control the operation of the movement of tractor 12 when interconnected by coupler 29 disclosed herein. It should be noted that although actuating cylinders have been disclosed for moving the following tractor 12 with respect to the leading tractor 11, other suitable turning means may be utilized. For example, collar 44 may be formed by a suitable motor such as a centrifugal or other form of pivotal motor mounted at this point to provide a turning torque for movement of arm 40 relative to connecting arm 43 of coupler 29 to move the front end of tractor 12 relative to tractor 11 to provide the necessary following movement of tractor 12. Thus, suitable fluid or electrical controls 50 can be used by the operator of tractor 11 to control tractor 12. Dual controls must also be provided for controlling the engine operation of tractor 12 and its wheel driving function by the operator of tractor 11 in order to provide a unitary operating four wheel drive vehicle.

It should be noted that the longitudinal movement of collar 44 along arm portion 39 of coupler 29 should be limited and this can be accomplished by any suitable means, such as pins or flanges on arm portion 39. By limiting the movement of collar 44, compensation is provided for the missing front of tractor 11 thereby aiding in balancing the weight of the assembled four wheel drive vehicle 13.

Further, it should be noted that the relative lengths of the various arms of the tractors may be changed to fit the needs of the particular tractors being assembled into a single vehicle. Still further, for some particular model tractors the arm 38 of the coupler 29 may be omitted with arm portion 39 extending laterally from shaft 28.

To connect tractors 11 and 12 together, the coupler 29 is first attached to its three point hitch connection formed by side arms 22, 23 and the flange 42. Tractor 12 is then jacked up and its front axle removed. Tractor 11 is then backed into cooperating relationship with tractor 12 so that connecting arm 43 may be extended into the front wheel housing 47 of tractor 12 to thereby connect connecting arm 43 of coupler 29 to frame 15' of tractor 12.

Although but a few embodiments of the invention have been shown and described, it will be apparent to those skilled in the art that various changes and modifications may be made therein without departing from the spirit of the invention or from the scope of the appended claims.

What is claimed is:

1. Coupling means for detachably connecting the rear of a first front wheelless rear axle driven tractor with the front of a second front wheelless rear axle driven tractor for forming a four wheel drive vehicle comprising:

an elongated shaft for mounting laterally of the longitudinal axis of the rear of a first front wheelless rear axle driven tractor, said shaft being provided with bearing surfaces at each end thereof for being supported by the ends of a pair of spacedly arranged tie bars mounted on the rear of said first tractor and extending rearwardly therefrom, said shaft having an arm mounted thereon a first portion of which extends laterally thereof in substantially a vertical plane when the coupler interconnects two tractors and a second portion integral with the end of said first portion and extending laterally therefrom for attachment to the rear tractor along its longitudinal axis, said first portion supporting in pivoted relationship therewith a collar mounted around its outer periphery, and a connecting arm extending laterally of the longitudinal axis of said collar for fixedly connecting to the wheel mounting of the second tractor, means for limiting the longitudinal movement of said collar along said first portion of said arm, said second portion of said arm and said connecting arm are arranged in parallel planes.

2. The coupling means set forth in claim 1 in further combination with:

actuating means connected to said coupling means for pivotally moving said connecting arm relative to said arm for moving the front of said second tractor relative to the rear of said first tractor.

3. Coupling means for detachably connecting the rear of a first front wheelless rear axle driven tractor with the front of a second front wheelless rear axle driven tractor for forming a four wheel drive vehicle comprising:

an elongated shaft for mounting laterally of the longitudinal axis of the rear of a first front wheelless rear axle driven tractor, said shaft being provided with bearing surfaces at each end thereof for being supported by the ends of a pair of spacedly arranged side arms mounted on the rear of the first tractor and extending rearwardly therefrom, said shaft having an arm mounted thereon comprising a first portion extending laterally thereof in substantially the same plane as said shaft, a second portion integral with the free end of said first portion and extending laterally thereof, and a third portion attached to and extending from the free end of said second portion and laterally thereof in the same direction as said first portion, said second portion supporting in pivoted relationship therewith a collar mounted around its outer periphery, and a connecting arm extending laterally of the longitudinal axis of said collar for fixedly connecting to the front wheel mounting of the second tractor.

4. The coupling means set forth in claim 3 wherein: said connecting arm extends laterally of the longitudinal axis of said collar in a plane substantially parallel with the planes of said first and third portions.

5. The coupling means set forth in claim 3 wherein: said third portion extends from the free end of said second portion and laterally thereof in a second plane substantially parallel with plane of said first portion.

6. The coupling means set forth in claim 3 wherein: said first, second and third portions of said arm are formed integral with each other.

7. The coupling means set forth in claim 5 wherein: said second portion of said arm extends substantially perpendicular to said first and third portions of said arm.

8. The coupling means set forth in claim 7 in further combination with:

actuating means connected to said coupling means for pivotally moving said connecting arm relative to said arm for moving the front of said second tractor relative to the rear of said first tractor.

9. The coupling means set forth in claim 8 wherein: said actuating means comprises a pair of fluid operated cylinders, one of said cylinders being pivotally connected with one end of said shaft and connectable with a first point on the front of the second tractor and the other of said cylinders being pivotally connected with the other end of said shaft and connectable with a second point spaced from the first point on the front of the second tractor.

10. The coupling means set forth in claim 9 wherein: said fluid cylinders comprise hydraulically operated motors comprising a cylinder and movable piston operable therein.

11. The coupling means set forth in claim 7 wherein: said actuating means comprises a centrifugal motor means mounted on said second portion of said arm for pivoting said connecting arm relative to said arm.

12. The coupling means set forth in claim 11 wherein:

said centrifugal motor comprises a part of said second portion of said arm.

* * * * *